(12) United States Patent
Thomas

(10) Patent No.: US 9,663,248 B2
(45) Date of Patent: May 30, 2017

(54) WORKBENCH ASSEMBLY

(71) Applicant: THE BOEING COMPANY, Chicago, IL (US)

(72) Inventor: Samuel Ray Thomas, North Charleston, SC (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 14/705,363

(22) Filed: May 6, 2015

(65) Prior Publication Data

US 2016/0325852 A1    Nov. 10, 2016

(51) Int. Cl.
| | | |
|---|---|---|
| *B64F 5/00* | (2006.01) | |
| *B25B 11/00* | (2006.01) | |
| *B64F 5/10* | (2017.01) | |
| *B25H 1/02* | (2006.01) | |
| *B25H 1/10* | (2006.01) | |

(52) U.S. Cl.
CPC .............. *B64F 5/10* (2017.01); *B25H 1/02* (2013.01); *B25H 1/10* (2013.01)

(58) Field of Classification Search
CPC ... A47F 5/01; A47F 5/13; A47B 45/00; B25B 11/00; B64F 5/0009; B64F 5/10; B25H 1/02; B25H 1/10
USPC .................................. 269/58, 296; 211/182
See application file for complete search history.

(56) References Cited

U.S. PATENT DOCUMENTS

| | | | | |
|---|---|---|---|---|
| 3,276,558 A | * | 10/1966 | Guske .................... | B65G 13/12 193/35 TE |
| 4,630,550 A | * | 12/1986 | Weitzman .............. | A47B 13/06 108/155 |
| 5,050,288 A | * | 9/1991 | Woods .................... | B21J 15/10 29/407.1 |
| 5,224,584 A | * | 7/1993 | Best ....................... | B65G 13/07 193/35 TE |
| 5,456,348 A | * | 10/1995 | Whetsel ................. | B65G 13/12 198/782 |
| 6,347,592 B1 | | 2/2002 | Gessert | |
| 6,926,376 B2 | | 8/2005 | Arent et al. | |
| 7,357,238 B2 | * | 4/2008 | Zeigler .................. | E04H 15/50 193/35 TE |
| 2013/0285302 A1 | | 10/2013 | Helm | |
| 2014/0238277 A1 | | 8/2014 | Fishman et al. | |
| 2015/0298824 A1 | * | 10/2015 | Larson ................. | B64F 5/0009 29/559 |

* cited by examiner

*Primary Examiner* — Joseph J Hail
*Assistant Examiner* — Marc Carlson
(74) *Attorney, Agent, or Firm* — Patterson + Sheridan, LLP

(57) ABSTRACT

The present disclosure generally relates to modular workpiece support assemblies that are well suited for supporting large, irregularly shaped workpieces, such as curved aircraft workpieces. The modular workpiece support assemblies include a plurality of connected modular components which are pivotably attached to one another in order to adjust to the size, shape, and curvature of large, irregularly shaped workpieces. The modular components include support structures having a support platform coupled thereto for supporting a workpiece, and linking structures for coupling adjacent support structures to provide stability to the support legs.

14 Claims, 9 Drawing Sheets

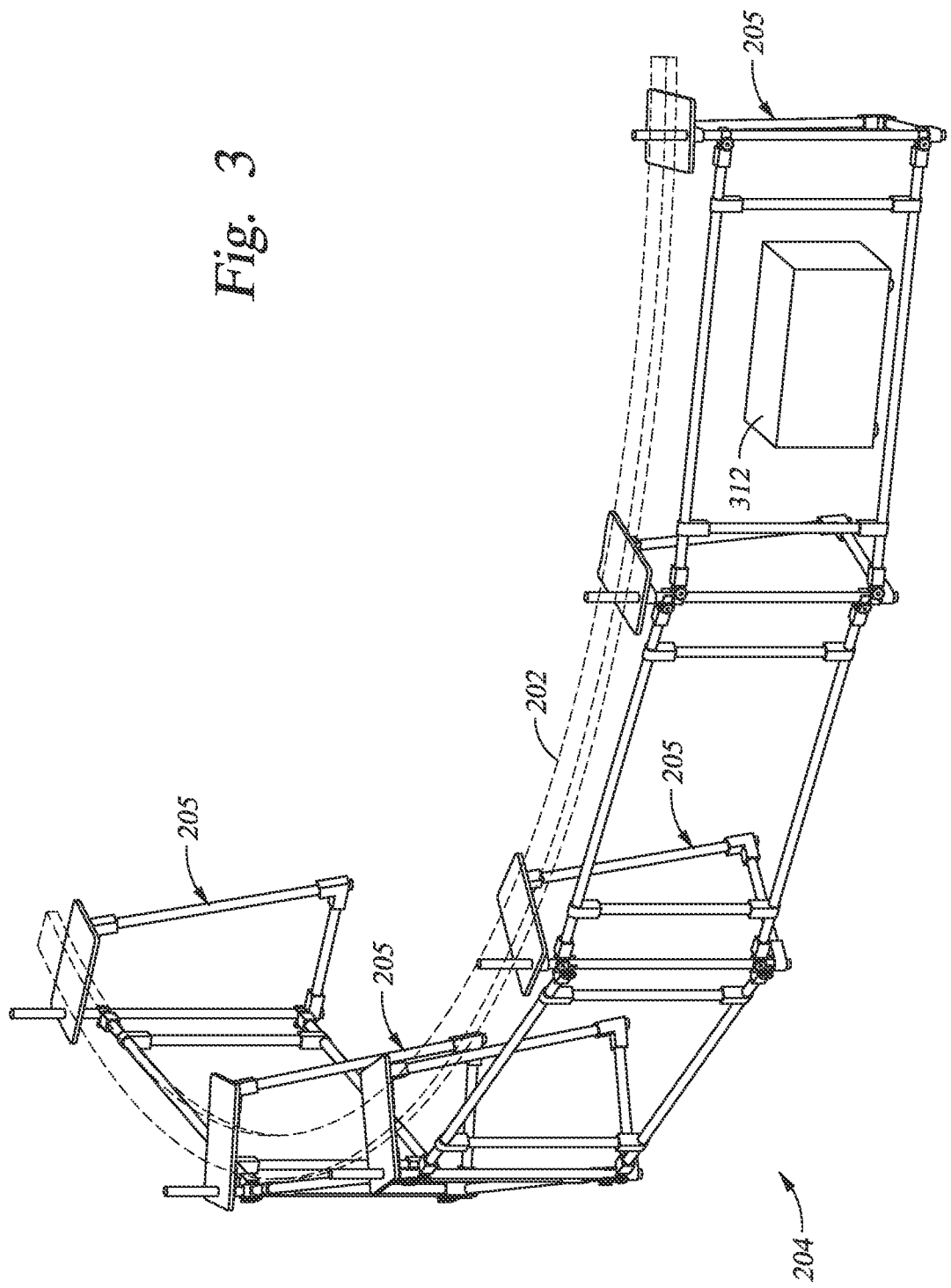

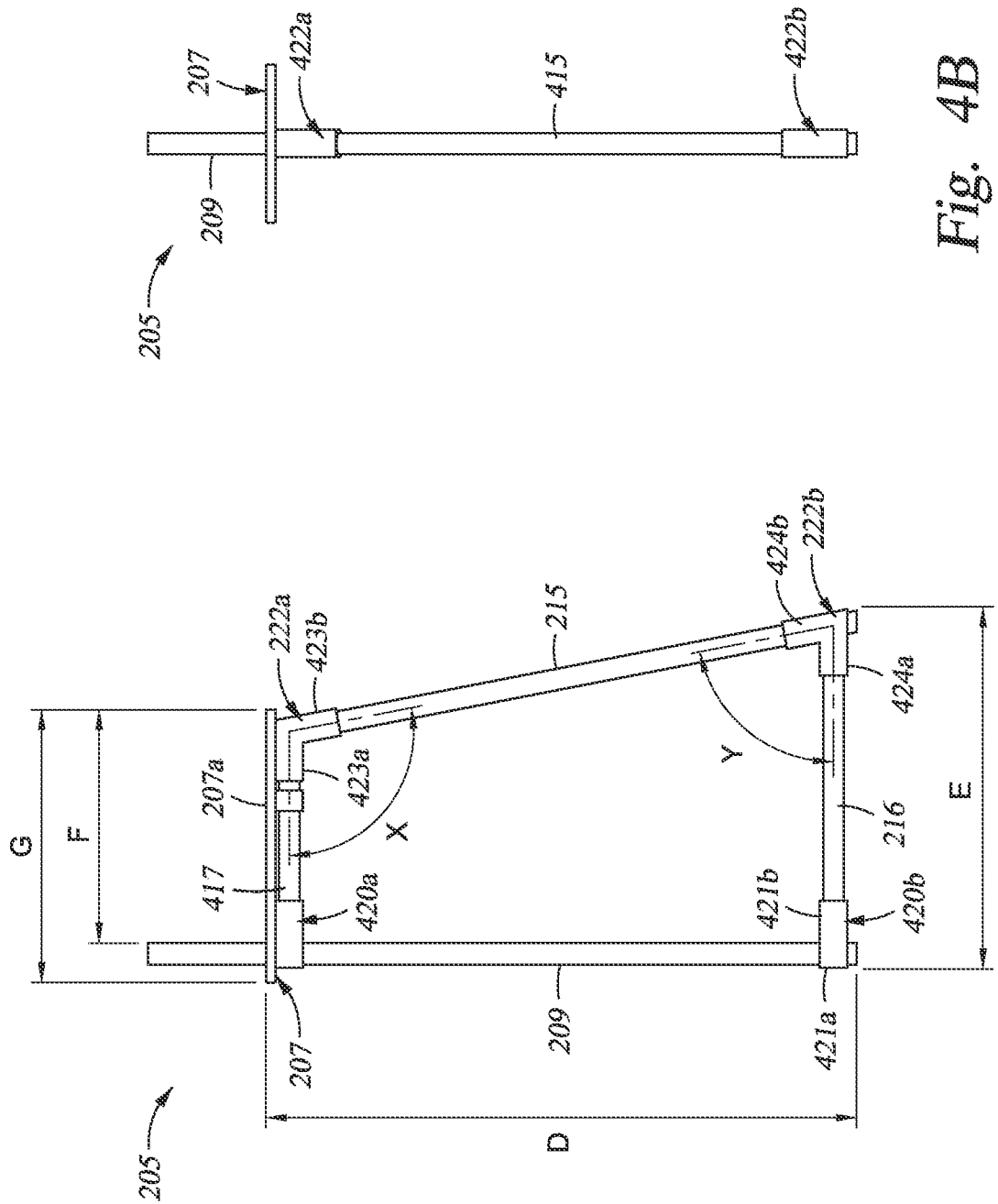

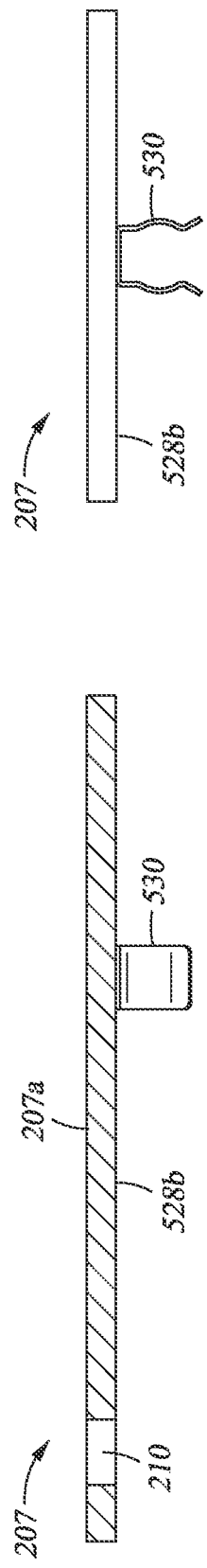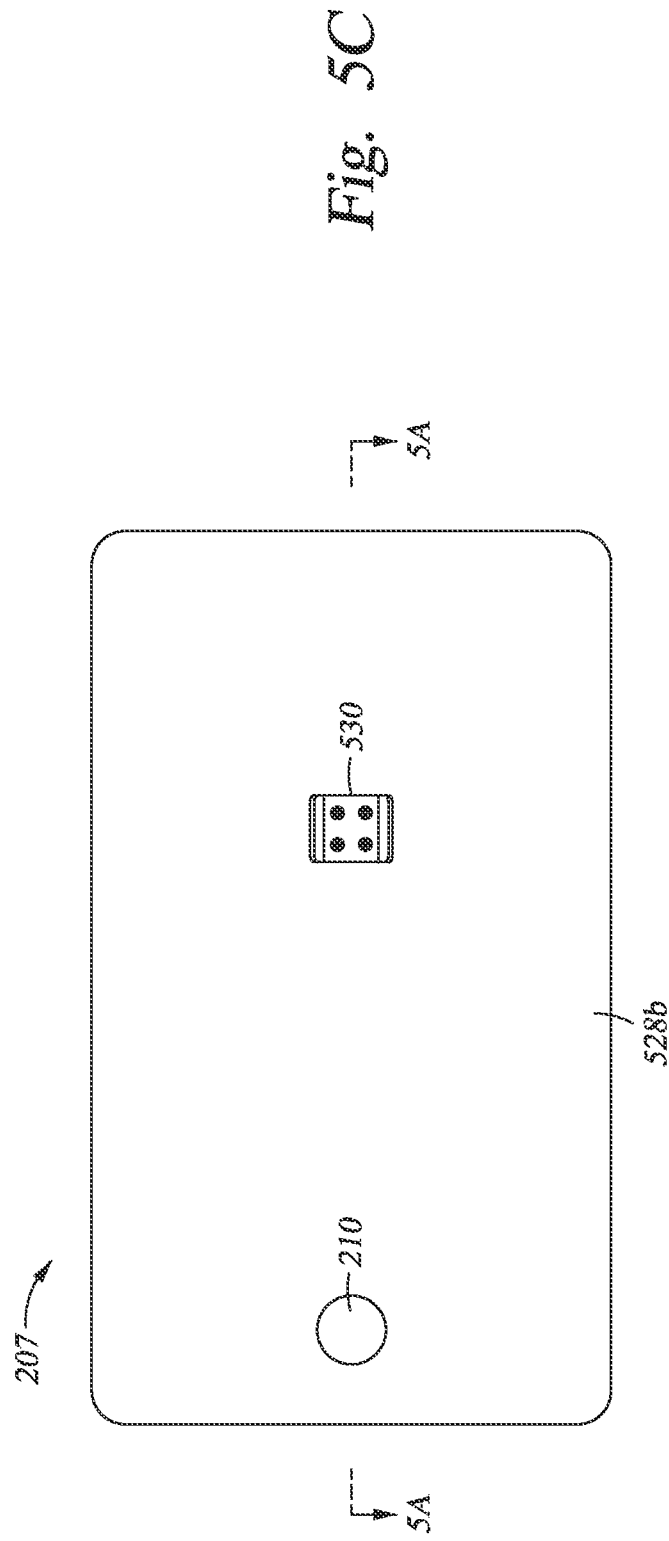

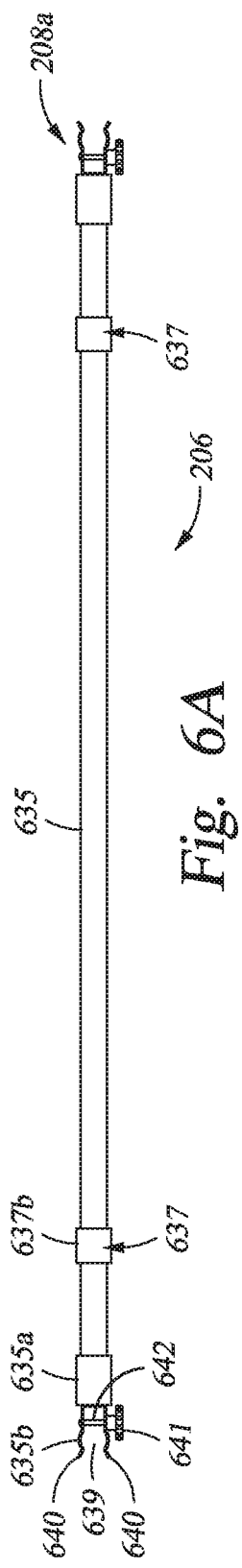
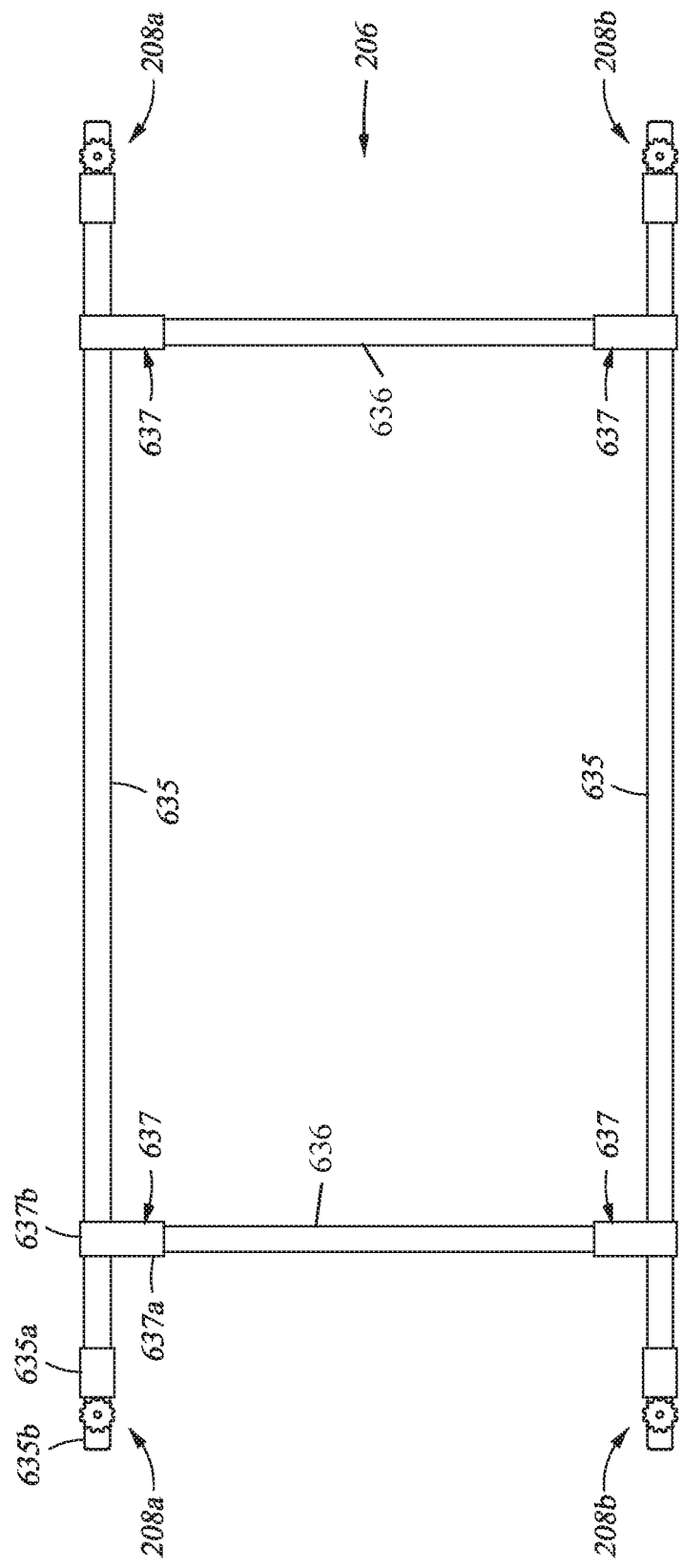

WORKBENCH ASSEMBLY

BACKGROUND

Field

Embodiments of the present disclosure generally relate to workpiece support assemblies, and in particular to workbenches or other supporting devices for workpieces.

Description of the Related Art

Workbenches for supporting workpieces generally come in standard sizes of 30 inches by 60 inches. This standard size works well for workpieces which are less than the dimension of the workbench. However, as workpieces exceed 60 inches in one dimension, the workbench can no longer adequately support the workpiece. In such a circumstance, multiple workbenches may need to be positioned end-to-end to provide a large enough supporting surface for the larger workpiece. Moreover, when the workpiece has a non-linear shape, such as, for example, a curve, arch or angle, simply positioning workbenches end-to-end may not properly support the workpiece. In addition, placing conventional workbenches end-to-end may prevent operators from close proximity to all areas of the workpiece needing attention.

FIG. 1 is a schematic top view of a conventional workpiece support structure 100. The workpiece support structure 100 includes multiple workbenches 101a-101c (three are shown) of a standard size (e.g., 30 inches by 60 inches) utilized to support a single curved workpiece 102. The workbenches 101a-101c required to support the workpiece 102 use a significant amount of floor space, which may ultimately drive up overhead costs due to the larger workspace required for processing the workpiece 102 in a shop or fab. Moreover, utilization of the workbenches 101a-101c decreases efficiency of operators (such as mechanics or other personnel) working on the workpiece 102. For example, due to the large occupied floor space of the workbenches 101a-101c, an operator must spend great amounts of time walking around the workbenches 101a-101c to have access to all portions of the workpiece 102. Referring to FIG. 1, an operator would need to travel from location A, to location B, and then to location C along path 103 to access all portions of the workpiece 102. Locations A, B, and C are positioned on opposite sides of the workbenches 101a-101c, thereby increasing the distance between each location. Repetitive traveling along the path 103 results in a considerably inefficient use of time.

Therefore, there is a need in the art for a workpiece support for workpieces, such as those that are large or irregularly shaped that occupies less floor space and that has a more ergonomic design.

SUMMARY

The present disclosure generally relates to modular workpiece support assemblies that are well suited for supporting large, irregularly shaped workpieces, such as curved aircraft frame components. The modular workpiece support assemblies include a plurality of connected modular assemblies which are pivotably attached to one another in order to adjust to the size, shape, and curvature of large, irregularly shaped workpieces. The modular components include support structures having a support platform coupled thereto for supporting a workpiece, and linking structures for coupling adjacent support structures to provide stability to the support legs.

In one embodiment, a workpiece support assembly comprises a plurality of support structures, each support structure comprising: a rear support post; a front support post; an upper support post coupling the rear support post and the front support post; a lower support post coupling the rear support post and the front support post; and a platform for supporting a workpiece, the platform disposed over the upper support post. The workpiece support assembly also comprises a linking structure coupling the each support structure to the next adjacent support structure through couplings.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and the disclosure may admit to other equally effective embodiments.

FIG. 3 is a schematic perspective view of a workpiece support assembly supporting a curved workpiece thereon, according to one aspect of the disclosure.

FIGS. 4A and 4B are respective schematic side and front views of a support structure, according to one aspect of the disclosure.

FIGS. 5A-5C are respective schematic side, end, and bottom views of a support platform, according to one aspect of the disclosure.

FIGS. 6A and 6B are respective schematic top and front views of a linking structure, according to one aspect of the disclosure.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

The present disclosure generally relates to modular workpiece support assemblies that are well suited for supporting large, irregularly shaped workpieces, such as curved aircraft frame components. The modular workpiece support assemblies include a plurality of connected modular assemblies which are pivotably attached to one another in order to adjust to the size, shape, and curvature of large, irregularly shaped workpieces. The modular components include support structures having a support platform coupled thereto for supporting a workpiece, and linking structures for coupling adjacent support structures to provide stability to the support legs.

Figure 2:
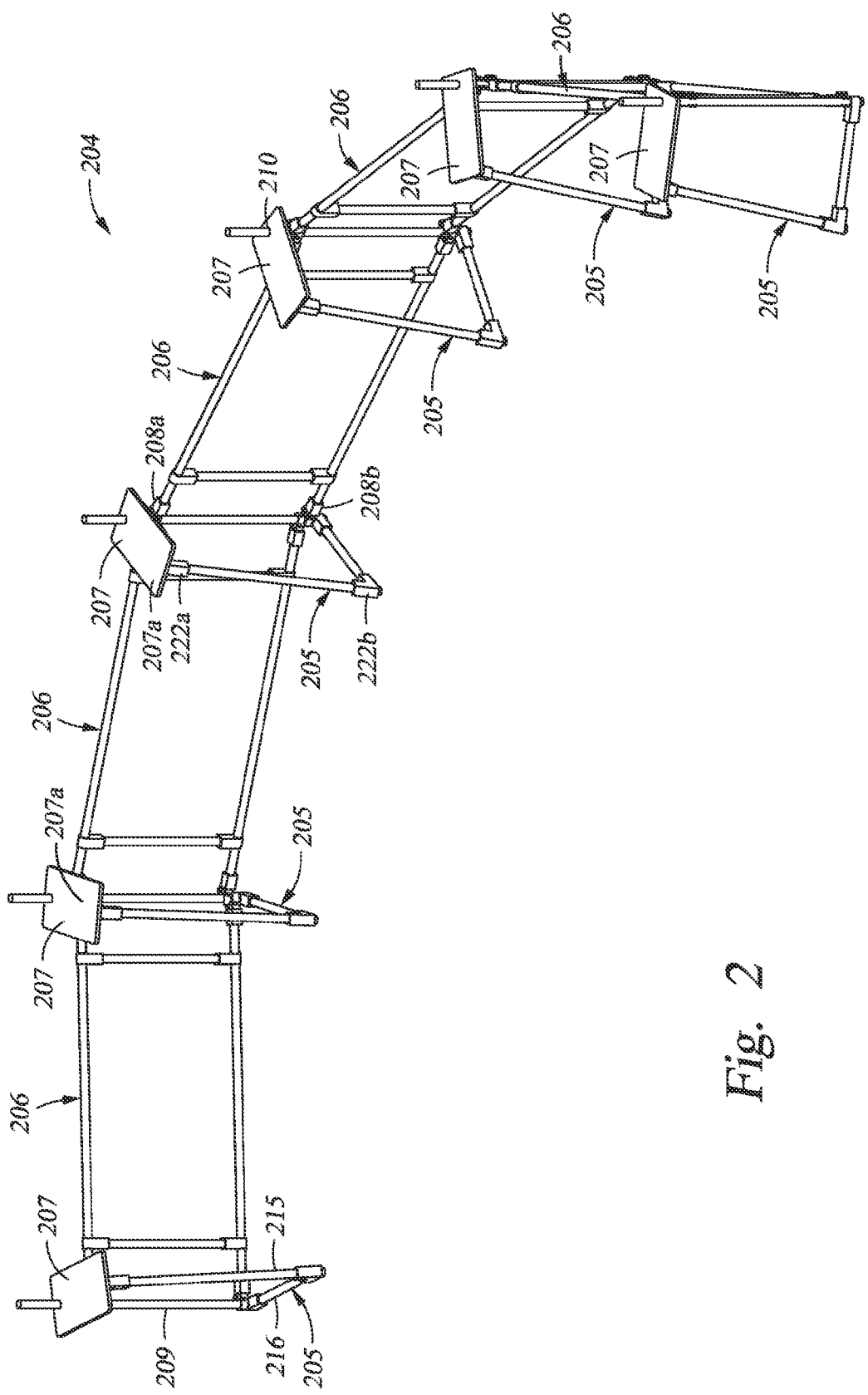
FIG. 2 is a schematic perspective view of a workpiece support assembly, according to one aspect of the disclosure.

FIG. 2 is a schematic perspective view of a workpiece support assembly 204, according to one aspect of the disclosure. The workpiece support assembly 204 includes a plurality of support structures 205 adjacent to one another (six are shown). "Plurality" as used herein means at least two support structures. Each pair of adjacent support structures 205 are coupled together via a linking structure 206 (five are shown). Inwardly-located support structures 205 (e.g., the support structures 205 which are not positioned at the ends of the workpiece support assembly 204) may be coupled to multiple (for example, two) linking structures 206 to facilitate coupling of all of the support structures 205 such that all components of the workpiece support assembly 204 are coupled together, directly or indirectly. In one example, the workpiece support assembly 204 forms a substantially arcuate shape defined by the coupled linking structures 206, while having support structures 205 extending radially inward from the substantially arcuate shape. In one example, the support structures 205 may extend radially inward perpendicular to a tangent of the substantially arcuate shape. It is contemplated that more or less than six support structures 205 and more or less than five linking structures 206 may be utilized to form a workpiece support assembly 204 of desired size or shape.

Each support structure 205 includes a rear support post 209, a front support post 215, a lower support post 216, an upper support post 417 (shown in FIG. 4), and a support platform 207. An elbow 222a couples the upper support post 417 to the front support post 215. An elbow 222b couples the lower support post 216 to the front support post 215. Respective upper and lower couplings 420a, 420b (shown in FIG. 4) couple the upper support post 217 and the lower support post 216 to the rear support post 209 at opposite ends of the rear support post 209.

Each support structure 205 includes a support platform 207 disposed at an upper end thereof. The support platform 207 is positioned about parallel to a floor upon which a support structure 205 rests, and about normal to the rear support post 209 of the support structure 205. The support platform 207 has an upper surface 207a upon which a workpiece is rested. The support platform 207 includes an opening 210 formed therethrough. The rear support post 209 of the support structure 205 extends through the opening 210, thereby preventing rotation of the support platform 207 about an axis perpendicular to the rear support post 209. Thus, the support platform 207 maintains an orthogonal relationship with respect to the rear support post 209.

The support structures 205 are coupled to one or more respective linking structures 206 via couplings 208a, 208b. In one example, the couplings 208a, 208b may be U-shaped or C-shaped to facilitate pivoting of the support structure 205 relative to the linking structure 206 within the couplings 208a, 208b. Pivoting of the support structure 205 is facilitated by rotation of a rear support post 209 of the support structure 205 within the couplings 208a, 208b. Pivoting of the support structures 205 relative to the linking structures 206 allows the workpiece support assembly 204 to assume a non-linear shape, such as an arcuate shape, which may be beneficial when supporting arced or other non-linear workpieces. Moreover, rotation of the support structure 205 within the couplings 208a, 208b allows the degree of arc of the workpiece support assembly 204 to be adjusted to accommodate workpieces of different sizes and/or curvature.

Figure 1:
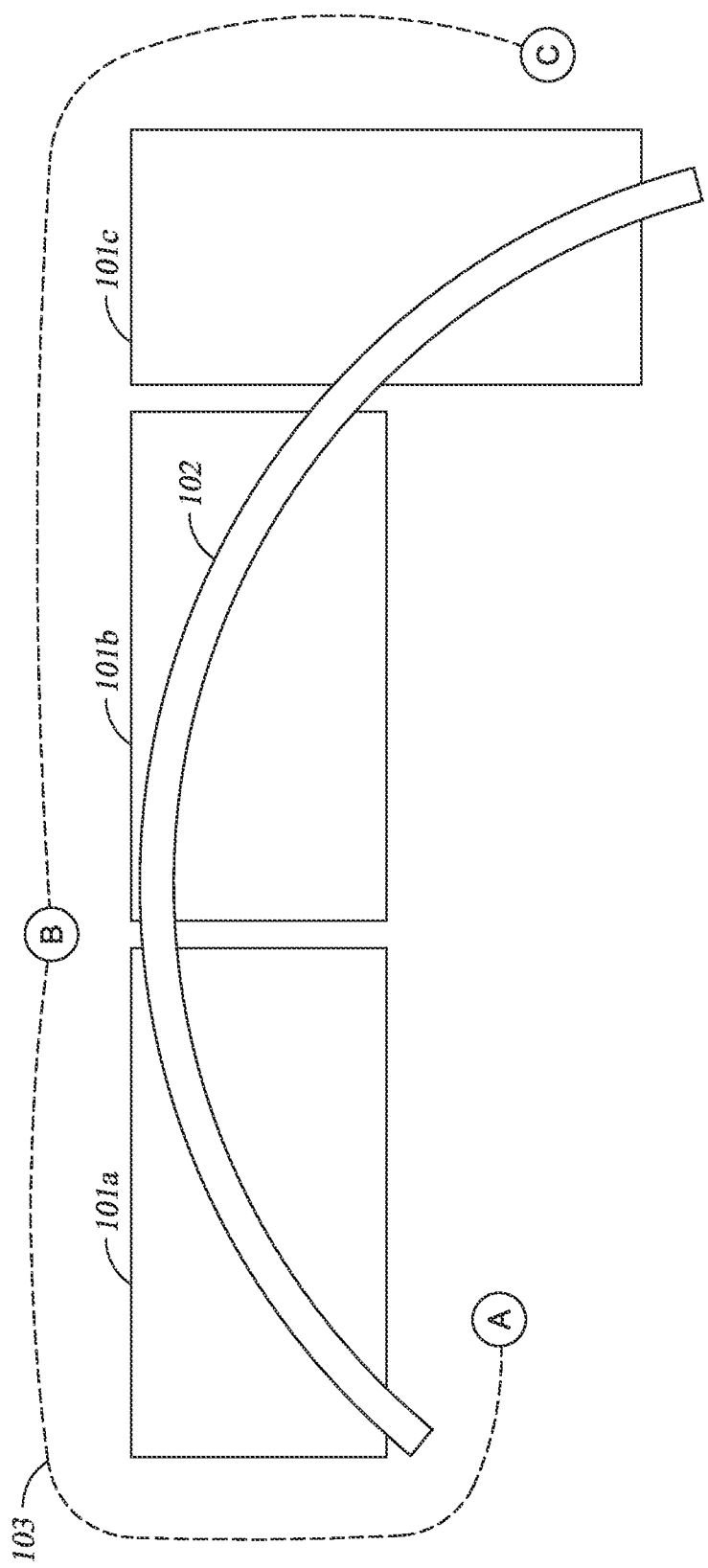
FIG. 1 is a schematic top view of a conventional workpiece support assembly.

FIG. 3 is a schematic perspective view of a workpiece support assembly 204 supporting a workpiece 202 thereon, according to one aspect of the disclosure. In the aspect illustrated in FIG. 3, the support structures 205 have been rotated relative to the linking structures 206 such that the curvature of the workpiece support assembly 204 matches the curvature of the workpiece 202. The complimenting curvature of the workpiece support assembly 204 and the workpiece 202 reduces the floor space occupied by the workpiece support assembly 204 because unused support areas of the workpiece support assembly 204 are minimized. In addition, the workpiece support assembly 204 provides access to the operators of most areas of the workpiece 202. In contrast, conventional workpiece support structures, such as the workpiece support structure 100 shown in FIG. 1, includes excess area which is not utilized to support a workpiece, and thus undesirably occupies floor space.

Moreover, because the workpiece support assembly 204 significantly reduces unused support areas, in contrast to conventional workpiece support structures, an operator can interact with the entire workpiece 202 while remaining on a single side of the workpiece support assembly 204 (e.g., either on the interior of the curvature of the workpiece support assembly 204, or along the outer edge of the curvature of the workpiece support assembly 204). Such an ergonomic shape reduces the amount of walking or other movement of the operator as work is performed on the workpiece 202, and provides access to more areas of the workpiece, thus increasing work efficiency.

In addition, the ergonomic design of the workpiece support assembly 204 facilitates storage of rolling tool chests or benches, such as the tool holder 312, between the support structures 205 of the workpiece support assembly 204 and beneath the workpiece 202. Thus, the tool holder 312 does not occupy additional, valuable floor space as the tool holder 312 otherwise would when utilizing conventional workpiece support structures. Furthermore, storage of the tool holder 312 in this configuration allows an operator to interact with the workpiece 202 while the tool holder 312 is positioned between the operator and the workpiece 202, because excessive reaching by the operator to interact with the workpiece 202 is minimized. Thus, tools on the tool holder 312 are conveniently accessible to the operator while maintaining the tool holder 312 in an unobtrusive location. As the operator travels along the workpiece 202, the tool holder 312 may be moved and repositioned such that tools thereon are conveniently accessible to the operator.

FIGS. 4A and 4B are respective schematic side and front views of a support structure 205, according to one aspect of the disclosure. Each support structure 205 includes a rear support post 209, a front support post 215, a lower support post 216, an upper support post 417, and a support platform 207. The upper support post 417 and the lower support post 216 are positioned parallel to one another and perpendicular to the rear support post 209. Respective upper and lower couplings 420a, 420b couple the upper support post 417 and the lower support post 216 to the rear support post 209 at opposite ends of the rear support post 209. Each coupling 420a, 420b may have a first end 421a having an opening therein for receiving either an upper support post 417 or a lower support post 216 within the opening. Additionally, each coupling 420a, 420b may have a second end 421b having a second opening formed therethrough for receiving the rear support post 209 therein. In one example, the opening formed through the second end 421b of a coupling 420a, 420b is perpendicular to the opening formed in the first end 421a of a coupling 420a, 420b.

An elbow 222a is coupled to the upper support post 417 on an end of the upper support post 417 opposite of the coupling 420a. The elbow 222a has a first end 423a which includes an opening for receiving and securing the upper support post 417, and a second end 423b which includes an opening for receiving and securing the front support post 215. The first end 423a and the second end 423b are disposed at an angle X relative to one another. In one embodiment, X is greater than 90 degrees. Similarly, an elbow 222b is coupled to the lower support post 216 on an end of the lower support post 216 opposite the coupling 420b. The elbow 222b includes a first end 424a having an opening for receiving and securing the lower support post 216, and a second end 424b having an opening for receiving and securing the front support post 215. The first end 424a and the second end 424b are disposed at an angle Y relative to one another. In one example, Y is less than 90 degrees, where Y equals 180 degrees minus X. It is contemplated that the rear support post 209, the lower support post 216, the upper support post 417, and the front support post 215 may be secured in a respective coupling 420a, 420b or a respective elbow 222a, 222b via an interference fit to facilitate ease of construction and dismantling.

The front support post 215 is disposed nonparallel to the rear support post 209 such that a base or lower end of the support structure 205 has a length E which is less than a length F of the upper portion of the support structure 205. Thus, the lower support post 216 has a length greater than a length of the upper support post 417. The greater width E at the lower portion relative to the width F at the upper portion facilitates stability of the support structure 205 by creating a wider base.

A support platform 207 is disposed over an upper surface of the upper support post 417. The support platform 207 is positioned parallel to the upper support post 417, and has a length G. In one example, the length G is greater than the length F. In another example, the length G is less than the length E. In such an example, the relatively wide base of the support structure 205 having a width E facilitates increased stability of the support structure 205, while the relatively small width G of the support platform 207 facilitates a reduced proximity of an operator to a workpiece 202 (shown in FIG. 3) positioned on the support platform 207 while an operator is interacting with the workpiece 202. The support platform 207 includes an upper surface 207a for supporting a workpiece, such as workpiece 202 shown in FIG. 3, thereon. The rear support post 209 may extend vertically above the upper surface 207a of the support platform 207. In such an embodiment, a workpiece 202 may abut against the extended portion of the rear support post 209 to reduce movement of the workpiece 202 and to prevent the workpiece 202 from accidentally moving off of the backside of the support platform 207.

In one example, the support platform 207 may be positioned a height D from the floor, such as about 24 inches to about 36 inches, for example 30 inches. In one example, leg support structure 205 may have a base with length E, such as about 14 inches to about 26 inches, for example about 18 inches. The support platform 207 may have a length G of about 8 inches to about 20 inches, such as about 14 inches. The distance between the front of the support platform 207 and an edge of the rear support post 209 may be a length F of about 6 inches to about 20 inches, such as about 12 inches. Other dimensions, however, are also contemplated.

The support posts 209, 215, 216, and 417 may be constructed using posts having a desired diameter sufficient to facilitate workpiece support. For example, the posts may have a diameter of about 1 inch to about 3 inches. However, other diameters are contemplated. It is contemplated that the posts may be hollow tubing. Similarly, the support platform may have a thickness sufficient to facilitate workpiece support, such as about 0.5 inches to about 2 inches. However, other thicknesses are also contemplated. In one example, the support posts 209, 215, 216, and 417, and the support platform 207, may be made from a polymer, such as polyvinylchloride or a rigid plastic, or metals, such as aluminum, steel, and the like. In another example, the support posts 209, 215, 216, and 417, and the support platform 207, may be made from a plastic-coated metal, such as steel or aluminum. Additionally, the elbows 222a, 222b and the couplings 420a, 420b may be formed from one or more polymers, plastics, metals, or plastic-coated metals. Other materials are also contemplated.

FIGS. 5A-5C are respective schematic side, end, and bottom views of a support platform 207, according to one aspect of the disclosure. The support platform 207 includes a support shelf 528 having an upper surface 207a on a top side thereof. An opening 210 is formed through the support shelf 528. The axial bore of the opening 210 is orthogonal to the upper surface 207a. A retaining clip 530, such a C-shaped clip, is disposed on a bottom surface 528b of the support shelf 528. The retaining clip 530 is adapted to engage an upper support post 417 (shown in FIG. 4) to prevent rotation of the support platform 207 about a rear support post 209 (shown in FIG. 4). In one example, the retaining clip 530 is open-ended to facilitate easy attachment to, and removal from, the upper support post 417. In such an example, the open end of the retaining clip 530 may be oriented away from the support shelf 528 to facilitate engagement with the upper support post 417. The retaining clip 530 may couple to the upper support post 417 via an interference fit. The retaining clip 530 may be formed from one or more polymers, plastics, metals, or plastic-coated metals; however, additional materials are also contemplated.

FIGS. 6A and 6B are respective schematic top and front views of a linking structure 206, according to one aspect of the disclosure. The linking structure facilitates coupling and stability of adjacent support structures 205 (shown in FIG. 2). The linking structure 206 includes a plurality of linking posts 635 (two are shown) positioned parallel to one another. The linking posts 635 are coupled together by a plurality of tie posts 636 (two are shown). The tie posts 636 are positioned parallel to one another and perpendicular to each of the linking posts 635. It is contemplated that more than two linking posts 635 or more than two tie posts 636 may be utilized.

The linking posts 635 and the tie posts 636 are coupled together via couplings 637 (four are shown). Each coupling 637 has a first end 637a having an opening into which an end of a tie post 636 is positioned, and a second end 637b, opposite the first end 637a and also having an opening therein, into which a linking post 635 is positioned. Each of the linking posts 635 and the tie posts 636 may be disengaged from a respective coupling 637 by removing a linking post 635 or a tie posts 636 from a respective opening of the coupling 637. The linking posts 635 and the tie posts 636 are secured within the couplings 637 via an interference fit to facilitate ease of construction and dismantling.

A coupling 208a is disposed at each end of the upper most linking post 635, outward of the tie posts 636. A coupling 208b is disposed at each end of the lower most linking post 635, outward of the tie posts 636. Each coupling 208a, 208b includes a first end 638a having an opening into which a linking post 635 is inserted in order to facilitate connecting of the couplings 208a, 208b to the linking post 635. Each coupling 208a, 208b also includes a second end 638b, opposite the first end 638a, adapted to engage a rear support post 209 of a support structure 205. The second end 638b includes a bore 639 therethrough, which is axially aligned with the rear support post 209 when engaged therewith. The second end 638b also includes a clamping structure having clamp arms 640. The inward pressure of clamp arms 640 is adjusted via a manually operated wheel 641 coupled to a threaded fastener 642. Rotation of the manually operated wheel 641 causes rotation of the threaded fastener 642 which moves the clamp arms 640 relative to one another, thereby adjusting the inwardly applied pressure therebetween. Thus, the couplings 208a, 208b are actuatable and facilitate quick assembly, disassembly, and adjustment of a workpiece support assembly 204 (shown in FIG. 2).

The linking posts 635 and the tie posts 636 may be constructed using posts having a desired diameter sufficient to facilitate workpiece support. For example, the posts may have a diameter of about 1 inch to about 3 inches; however, other diameters are contemplated. It is contemplated that the posts may be hollow tubing. In one example, the linking posts 635 and the tie posts 636 may be made from a polymer, such as polyvinylchloride or a rigid plastic, or metals, such as aluminum, steel, and the like. In another example, the linking posts 635 and the tie posts 636 may be made from a plastic-coated metal, such as steel. Additionally, the couplings 637 and the couplings 208a, 208b may be formed from one or more polymers, plastics, metals, or plastic-coated metals. Other materials are also contemplated.

Figure 7:
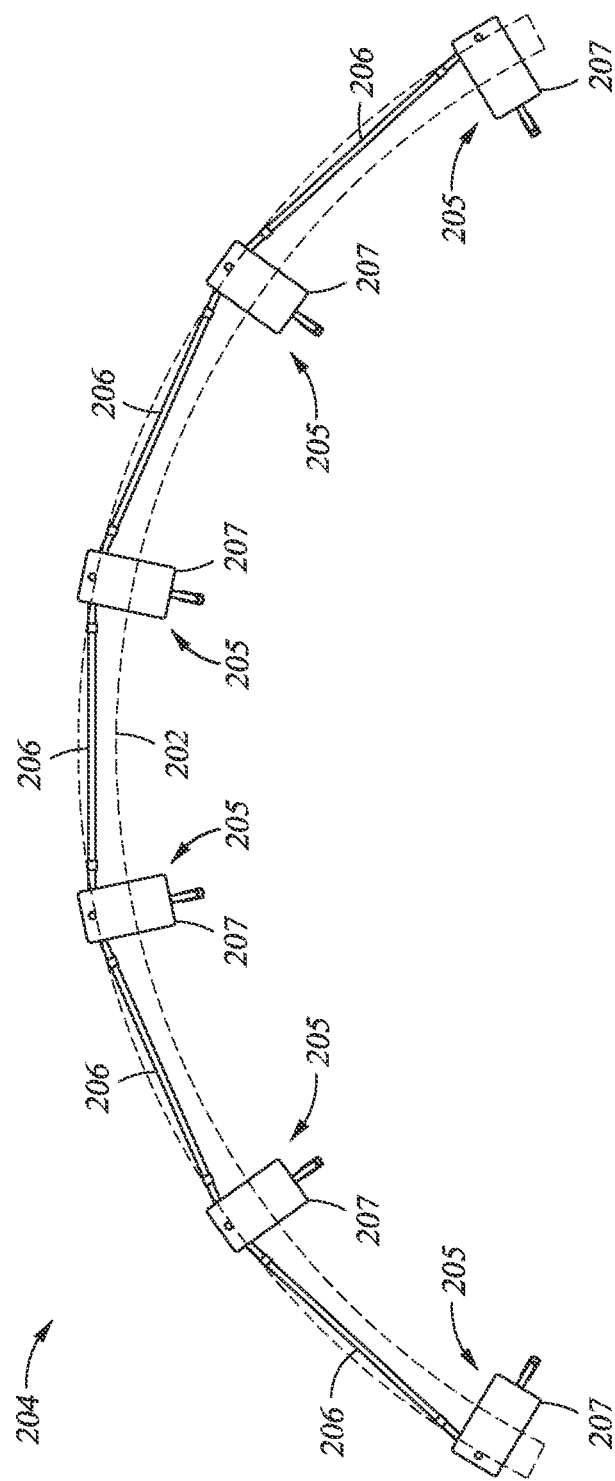
FIG. 7 is a schematic top view of a workpiece support assembly, according to one aspect of the disclosure.

FIG. 7 is a schematic top view of a workpiece support assembly 204, according to one aspect of the disclosure. The workpiece support assembly 204, as shown in FIG. 7, includes a plurality of support structures 205 (six are shown) and a plurality of linking structures 206 (five are shown) coupling the support structures 205 to one another. A workpiece 202 (shown in phantom), which may be a curved component of an aircraft, is supported upon the upper surfaces 207a of the support platforms 207. The workpiece may abut the rear support post 209, as shown, to prevent movement of the workpiece 202 in the direction of the rear support post 209. The number of support structures 205 and the number of linking structures 206 may be adjusted to accommodate a workpiece 202 of a particular size. Additionally, the relative angle between the support structures 205 and the linking structures 206, and/or between adjacent linking structures 206, may be adjusted to give the workpiece support assembly 204 the desired degree of arcing. In one example, the relative angle between the support structures 205 and the linking structures 206 may be easily and quickly adjusted by loosening the couplings 208a, 208b (shown in FIG. 6), moving the support structures 205 and the linking structures 206 relative to one another to obtain desired positioning, and tightening the actuatable couplings 208a, 208b. Loosening and tightening of the couplings 208a, 208b may be accomplished without the use of tools.

Figure 8:
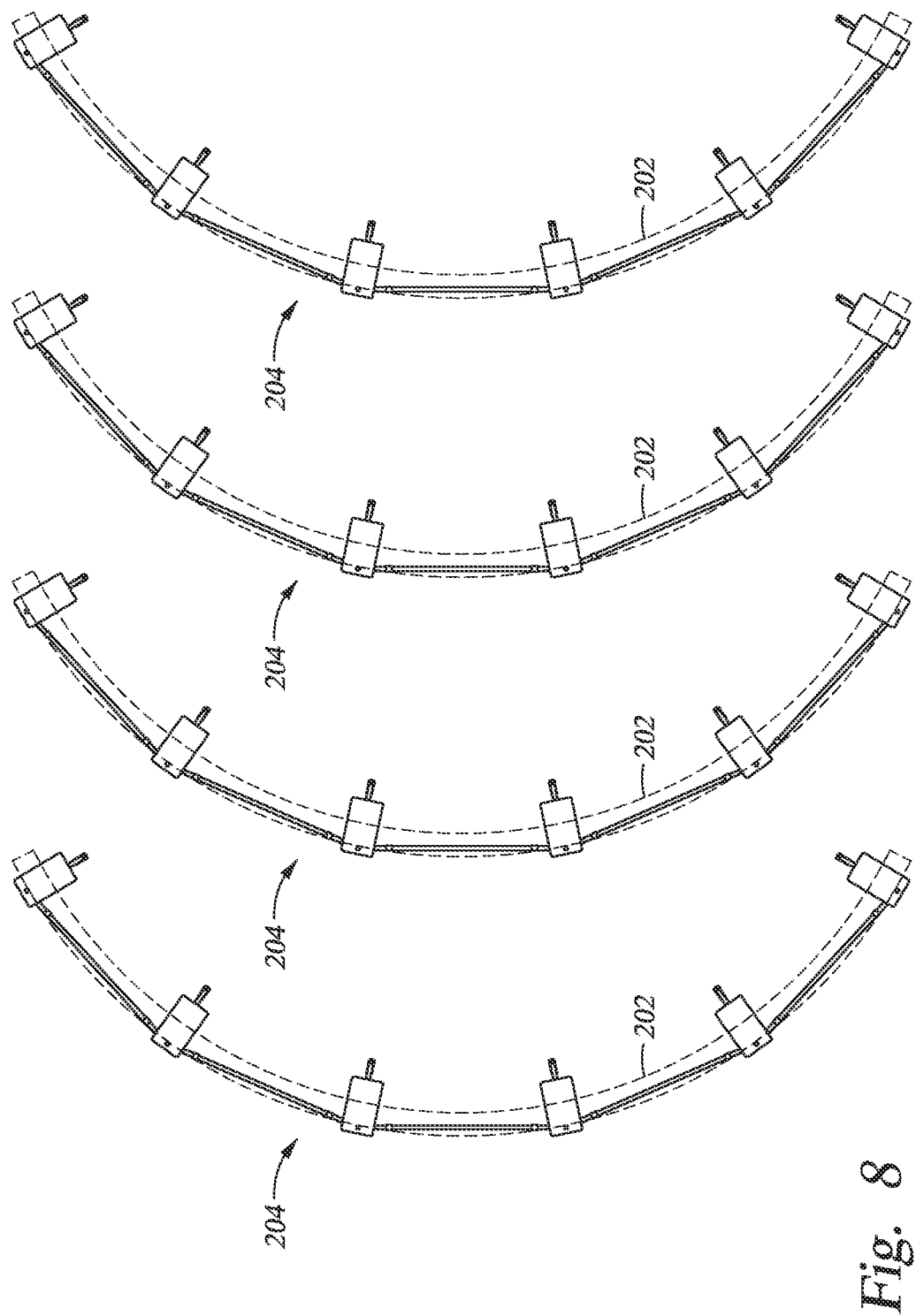
FIG. 8 is a schematic top view of multiple nested workpiece support assemblies, according to one aspect of the disclosure.

FIG. 8 is a schematic top view of a plurality of nested workpiece support assemblies 204, according to one aspect of the disclosure. While four workpiece support assemblies 204 are illustrated, each holding a workpiece 202 (shown in phantom), it is contemplated that more or less than four workpiece support assemblies 204 may be nested. Because the workpiece support assemblies 204 significantly reduce the amount of unused support area compared to conventional support structures, a greater number of workpiece support assemblies 204 can be utilized per unit area of floor space. Arranging the workpiece support assemblies 204 in a nested configuration further facilitates the efficient use of floor space to increase the number of workpiece support assemblies 204 per unit area.

Figure 9:
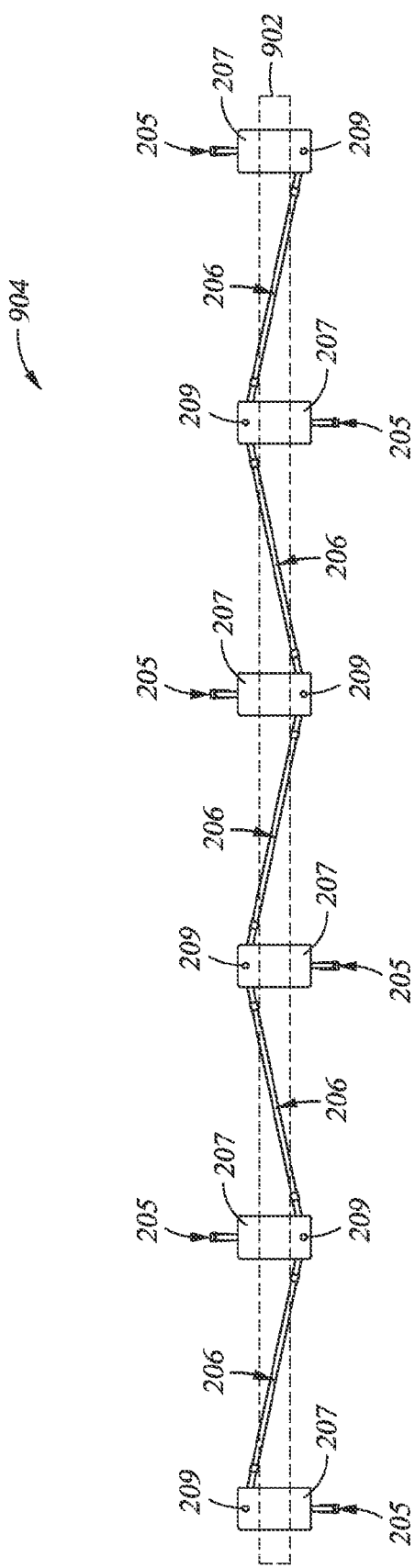
FIG. 9 is a schematic top view of a workpiece support assembly, according to another aspect of the disclosure.

FIG. 9 is a schematic top view of a workpiece support assembly 904, according to another aspect of the disclosure. The workpiece support assembly 904 is similar to the workpiece support assembly 204; however, the workpiece support assembly has been arranged in linear configuration in order to support a linear workpiece 902. The workpiece support assembly 904 includes a plurality of support structures 205 (six are shown) and a plurality of linking structures 206 (five are shown). The linking structures 206 are coupled to the rear support posts 209 (shown in FIG. 2) of consecutive support structures 205. However, in contrast to the workpiece support assembly 204 in which the support structures 205 are oriented in the same direction (e.g., radially inward), the support structures 205 of the workpiece support assembly 904 are oriented in opposite directions (e.g., 180 degrees relative to one another).

The opposite orientations of consecutive support structures 205 facilitate stability in opposing directions when using the workpiece support assembly 904 to support a linear workpiece 902 thereon. In such a configuration, support platforms 207 are arranged linearly, while the linking structures 206 are configured in a saw tooth or other alternating configuration. Additionally, the alternately-oriented configuration of the support structures 205 positions the rear support posts 209 of the support structures 205 on opposite sides of the linear workpiece 902 to reduce the likelihood of the linear workpiece 902 falling from the support platforms 207. Moreover, in the linear configuration shown in FIG. 9, the workpiece support assembly 904 may have a smaller width than conventional workpiece support assemblies. In one example, the workpiece support assembly 904 may have a width that is about 20 percent to about 25 percent less than conventional workpiece support assemblies. For example, in one embodiment, the workpiece support assembly 904 may have a width of about 24 inches, while a conventional workpiece support assembly may have a width of about 30 inches.

Embodiments of the disclosed workpiece support assemblies are modular such that size (e.g., length) of the workpiece support assemblies can be increased or decreased to accommodate workpieces of varying dimensions. Moreover, the components of the workpiece support assemblies can be quickly and easily assembled and disassembled without tools, to facilitate storage, transportation, and erection of the workpiece support assemblies. The components of the workpiece support assemblies can be assembled in multiple configurations to support a variety of irregularly shaped and/or large workpieces.

Benefits of the disclosed embodiments include the ability to work on large, irregularly shaped, and/or curved workpieces while minimizing occupied floor space and improving operator ergonomics. The disclosed embodiments provide improved operator ergonomics, by (1) allowing an operator to get closer to a workpiece, thereby improving precision and tool control; (2) facilitating reconfiguration of the workpiece support assemblies without assistance from a second user; and (3) by eliminating the need for an operator to extend or overreach to have access to all areas of a workpiece. Moreover, disclosed embodiments also provide adequate support for the entire length of curved components. Additionally, the radius of the workpiece support assemblies can be easily adjusted for workpieces of different curvatures. The disclosed workpiece support assemblies also accommodate features which may protrude from edges of the workpieces, as support platforms are positioned intermittently and thus do not provide a continuous surface which may interfere with protrusions.

In addition, workpiece support assemblies disclosed herein provided flexible workspace configuration due to the multiple configurations of the workpiece support assemblies, as well as the reduced floor area occupied by the workpiece support assemblies. The workpiece support assemblies can be collapsed (e.g., folded up) in an accordion-like manner to reduce the amount of floor space occupied when not in use, or alternatively, the workpiece support assemblies may be completely dissembled, or dissembled into modular components.

While the foregoing is directed to embodiments of the present disclosure, other and further embodiments of the disclosure may be devised without departing from the basic scope thereof, and the scope thereof is determined by the claims that follow.

What is claimed is:

1. A workpiece support assembly, comprising:
   a plurality of support structures, each support structure comprising:
   a rear support post;
   a front support post;
   an upper support post coupling the rear support post and the front support post;
   a lower support post coupling the rear support post and the front support post; and
   a platform for supporting a workpiece, the platform disposed over the upper support post; and
   at least two linking structures, wherein each linking structure comprises at least two parallel linking posts having a coupling disposed on each opposite end thereof, the linking posts coupled together by at least two parallel tie posts;
   wherein each adjacent pair of the support structures is joined together by at least one of the linking structures, the rear support posts of each adjacent pair of the support structures is pivotably and directly coupled to the couplings on the opposite ends of the linking posts, and at least three of the plurality of support structures and at least two linking structures are configurable in an arcuate arrangement.

2. The workpiece support assembly of claim 1, wherein:
   a first elbow couples the upper support post to the front support post;
   a second elbow couples the lower support post to the front support post, wherein the second elbow is formed at a different angle than the first elbow;
   a first coupling couples the upper support post to the rear support post; and
   a second coupling couples the lower support post to the rear support post.

3. The workpiece support assembly of claim 1, wherein the workpiece support assembly supports an aircraft component.

4. The workpiece support assembly of claim 1, wherein each support structure comprises a first elbow for coupling the upper support post to the front support post.

5. The workpiece support assembly of claim 4, wherein the first elbow has a first end and a second end disposed at an angle greater than 90 degrees relative to one another.

6. The workpiece support assembly of claim 5, wherein each support structure comprises a second elbow for coupling the lower support post to the front support post.

7. The workpiece support assembly of claim 6, wherein the second elbow has a first end and a second end disposed at an angle less than 90 degrees relative to one another.

8. The workpiece support assembly of claim 1, wherein the plurality of support structures and the one or more linking structures comprise plastic-coated metal.

9. The workpiece support assembly of claim 8, wherein the metal comprises steel.

10. The workpiece support assembly of claim 1, wherein the plurality of support structures and the one or more linking structures comprise a polymer.

11. The workpiece support assembly of claim 1, wherein the upper support post of each support structure has a length less than the lower support post of each support structure.

12. A workpiece support assembly, comprising:
    a plurality of support structures, each support structure comprising:
    a rear support post;
    a front support post;
    an upper support post coupling the rear support post and the front support post;
    a lower support post coupling the rear support post and the front support post; and
    a platform for supporting a workpiece, the platform disposed over the upper support post wherein the rear support post of each support structure extends above a respective platform of the support structure; and
    at least two linking structures, wherein each linking structure comprises at least two parallel linking posts having a coupling disposed on each opposite end thereof, the linking posts coupled together by at least two parallel tie posts;
    wherein each adjacent pair of the support structures is joined together by at least one of the linking structures, the rear support posts of each adjacent pair of the support structures is pivotably and directly coupled to the couplings on the opposite ends of the linking posts, and at least three of the plurality of support structures and at least two linking structures are configurable in an arcuate arrangement.

13. The workpiece support assembly of claim 12, wherein the rear support post of each support structure is disposed through an opening formed in the platform of each support structure.

14. The workpiece support assembly of claim 13, wherein each platform includes a retaining clip on a bottom surface thereof, the retaining clip adapted to engage the upper support post a respective support structure of the plurality of support structures.

* * * * *